UNITED STATES PATENT OFFICE.

EDWIN C. ECKEL, OF WASHINGTON, DISTRICT OF COLUMBIA, ASSIGNOR, BY DIRECT AND MESNE ASSIGNMENTS, OF TWO-THIRDS TO ARTHUR C. SPENCER, OF WASHINGTON, DISTRICT OF COLUMBIA, AND ONE-THIRD TO ARCHIBALD COX, OF NEW YORK, N. Y.

PROCESS OF MAKING CEMENT.

1,255,995.      Specification of Letters Patent.      Patented Feb. 12, 1918.

No Drawing. Application filed April 17, 1911, Serial No. 621,604. Renewed January 3, 1918. Serial No. 210,234.

*To all whom it may concern:*

Be it known that I, EDWIN C. ECKEL, a citizen of the United States, residing at Washington, in the District of Columbia, have invented certain new and useful Improvements in Processes of Making Cement, of which the following is a specification.

This invention relates to processes of making cement; and it comprises a method of making a cement containing combined ferric oxid and silica, by the aid of a readily reactive form of silica of the type of infusorial or diatomaceous earth, kieselguhr or tripoli, or the like, in which a material containing iron, a lime-containing material and a sufficient quantity of such a reactive form of silica are admixed to give the ratio of silica to sesquioxid desired in the finished cement and the mixture burnt to form clinker; all as more fully hereinafter described and as claimed.

Calcareous cements of the ferric cement type as regards proximate constitution consist of a number of ill-understood compounds existing probably as colloid masses, as solid solutions and as discrete crystals or granules. These compounds are composed of or comprise lime, silica and iron sesquioxid. More or less magnesia, baryta, alkalis, etc., may replace part of the lime. More or less alumina may replace part of the ferric oxid. While the nature of the proximate bodies forming cement of this type is, as stated, not well known, the proportions in which the three constituents must occur for the best results, or the ultimate constitution, are fairly well settled empirically though these proportions may vary for different purposes. Broadly speaking, the cements richer in silica are the stronger and usually sounder.

In practice however it is difficult to establish any desired and definite ratios between the three bodies in making ferric cements; or to secure high silica ratios as regards the combined silica of the cement. While low-silica ferric cements are suitable for some purposes for others it is highly desirable to have a high silica ratio; a ratio of silica to ferric oxid (and alumina) of at least 2:1. To make a ferric cement which shall approximate in strength and other properties to normal or commercial Portland cement standards, it is desirable to raise this ratio even higher; to, say, 5:2 or 3:1. And this is difficult with most of the available raw materials.

Ferric cements may be made by heating suitable materials comprising the three constituents, iron oxid, lime and silica, to a rather definite temperature, that at which "clinkering" or semi-fusion, sintering or fritting takes place. The exact nature of the compounds thus formed and existing in the cement is, as stated, not well understood, but it has been established empirically that those which are desired are formed at this temperature and are preserved on cooling the clinker, while at higher temperatures there are formed fused products of less desirable properties. A low temperature of course does not result in combination. The rate of cooling either of the clinker or of a fused mass also has much influence on the proximate composition and consequent properties of the cement.

Suitable materials may be ground together dry and the powder sent down through a rotary inclined kiln as a thin agitated stream traveling against an overlying countercurrent of flame and flame gases coming from a flame burning in the mouth of the kiln.

In going down through the kiln, the cement mixture undergoes a number of reactions. The first is the causticizing of the calcium carbonate to form lime which then unites with the other bodies to form clinker.

Under the range of temperatures and other conditions permissible in the cement kiln in making iron or ferric cement however difficulties occur with most raw materials in making clinker of uniform and predetermined composition; and particularly where a high silica ratio is desired. With natural iron silicates, such as glauconite, greenalite, etc., the silica occurs in a combined form in which it is reactive under cement kiln conditions; and with such a silicate uniform clinker can be made, but the ratio of silica in the clinker is necessarily restricted to that occurring in the silicate itself, which is usually rather low for the present purposes. Admixtures of sand, quartzose silica, siliceous gangue, etc., cannot be relied on to raise the combined silica of the clinker or to indeed produce any substantial part of the combined silica of such clinker since the reaction of crystallized or quartzose silica with the other components of a cement mixture under rotary kiln conditions is very slow and uncertain, and particularly in the case of a mixture for ferric cement. Other silicates than iron silicates of course cannot well be used since they would bring in other bases, such as magnesia, which is undesirable in a cement, or alumina, which would replace part of the iron. Artificial silicates containing iron, such as slags from lead furnaces, copper furnaces, etc., are not usually suitable since they are relatively low in silica and carry sulfur and heavy metals. Where the cement is to be made with some form of free iron oxid, such as iron ore, bluebilly, pyrites cinder, flue dust, etc., these difficulties are of course increased since it is necessary to add substantially all of the silica in the free form.

In view of the stated facts, it is evident that the composition of the final cement as regards the relative ratios of the three components in a combined state cannot be easily controlled. The lime per cent. can be easily controlled; but as regards the ratio of combined silica and of ferric oxid to each other, the conditions are different. The ratio of iron can be readily raised, but it is, as stated, for many purposes more desirable to be able to raise the silica ratio. This is difficult.

I have found that by the use of certain forms of silica not only may ferric cements be readily made under rotary kiln conditions of any desired ratio of silica: ferric oxid: lime by direct union of such silica with lime and ferric oxid or iron ore, but that such forms of silica may also be usefully employed in controlling and heightening the silica ratio in cements made from the natural iron silicates.

I use certain non-quartzose natural forms of silica as a part of the mixture, silica in such form being added to the cement mixture in the amount necessary to give the desired combined silica ratio. Infusorial earth, kieselguhr, diatomaceous earth or tripoli are silica in a different and much more reactive form than that of silica as it occurs in ordinary sand and gravel. The silica of sand is quartzose and crystalline and does not readily react with dry alkalis or lime at temperatures below a fusing heat, whence, probably, its inertness in making ferric cements in the rotary cement kiln. On the other hand, the silica of diatomaceous earth is much more reactive, being probably colloid and nearer akin to the "nascent" state of the silica liberated from the silicates in the cement kiln. Under cement kiln conditions it readily reacts with the other components of a ferric cement mix. Diatomaceous earth is composed of the skeletons of infusoria; i. e., the silica has probably been deposited from the state of solution and has never had an opportunity to assume the condensed molecular, little reactive condition of the crystallized form of silica, of sand, or of quartz. From a crystallographic point of view, the silica is amorphous. Other forms of amorphous silica, such as native or artificial hydrated silica, "opaline" silica, or flint or chert may be substituted; but are not as advantageous. Flint or chert which is often a reactive form of silica is not commercially serviceable because of the character of the deposits in which flint or chert occur. It usually occurs as nodules or fragments scattered through a limestone mass that ordinarily require separation from the limestone and subsequent grinding in order to put them into condition for use in a cement mixture. Both of these operations are very expensive. It is difficult moreover in grinding flint to secure as finely divided a texture as that which is natural to diatomaceous earth; and even then it is not so readily reactive. The hydrated forms of silica, artificial or native, are relatively expensive and offer no advantage over diatomaceous earth.

In making a ferric cement from a natural iron silicate, such as glauconite or greenalite, I eke out the deficiency in the silica below the ratio between silica and ferric oxid desired in the final clinker by the addition of the corresponding amount of diatomaceous earth. With a greensand running, say 50 per cent. of silica and having iron corresponding to say 30 per cent. of ferric oxid, in order to make a cement having a ratio of, say 3:1 between the silica and ferric oxid, I add about 800 pounds of diatomaceous earth for every ton of such greensand. After the addition, the mixture is burnt to produce clinker, the potash, which is always a constituent of greensand, being fumed off and, advantageously, recovered; as by recovery with the kiln dust, etc.

In making ferric cement from iron oxids, such as ore, bluebilly, pyrites cinder, etc., advantageously all the silica desired in the combined form in the clinker may be added as diatomaceous earth, the natural free silica of the materials, which is mostly sand, being disregarded as inert. If there be clay or other alumina silicate in the mixture of course both the alumina and the combined silica must be allowed for in the calculations. A good mixture for cement purposes can be made from 1 part iron ore, 9 parts limestone and 2 parts diatomaceous earth. An equivalent amount of lime, either hydrated or quicklime, may be used in lieu of limestone. Obviously with ore, diatomaceous silica and lime, any desired ratio between the three components may be used, there being no such restrictions as occur with silicates. For most purposes it is desirable to have such a ratio between silica and iron oxid as, say, 1.5 to 3.5 times as much silica as oxid. Advantageously, for most purposes, the ratio approaches the higher limit. Sound, good cements are produced with 2.5 to 3.25 times as much silica as oxid. The lime of the clinker may vary between 55 and 68 per cent. Such a mixture of ore, diatomaceous earth and limestone may be run down through a rotary kiln with appropriate heating means and clinkered at a comparatively low temperature giving desirable cement compounds. It is not necessary, as in attempting to use sand, to raise the clinkering temperature to an unduly high point in order to induce the silica to go into combination.

Mixed cements carrying both alumina and ferric oxid as the sesquioxid component can be obtained by employing mixtures of clay and iron ore with the requisite amounts of limestone and of diatomaceous silica, the latter being in the amount which, taken in addition to the amount of combined silica imported into the mixture by the clay, will give the desired amount of combined silica in the resulting clinker. The amount of silica present in the materials as sand or quartzose silica, may be practically disregarded in the computations.

In the present method a desired predetermined silica-sesquioxid ratio is established and to a cement mixture of a kind appropriate for forming a cement of the lime-silica-ferric type is added enough diatomaceous earth to bring the total of the combined silica already in said mixture and of the silica of said added diatomaceous earth to an amount sufficient to establish said predetermined silica-sesquioxid ratio, and the mixture is then burnt to form a cement clinker. While this method is applicable to and advantageous for alumina-containing cements of the Portland type, I regard it as particularly adapted to iron-containing cements, whether made from natural iron silicates or from mixtures comprising free oxid of iron. For such mixtures it is, as stated, particularly advantageous owing to the extreme difficulty of inducing ordinary forms of silica, such as sand and the like, to react with ferric oxid-lime mixtures under the limiting kiln conditions necessary to obtain clinker yielding a sound cement.

With the aid of diatomaceous earth or kieselguhr, ochers and ocherous clays, bog iron ores, bauxites and clays containing free alumina, limestones and marls high in sesquioxids, and other materials containing sesquioxids in excess can be readily converted into sound cements of any desired content of silica by treatment in the rotary kiln. It is also available in utilizing high-alumina clays such as kaolinite to form good cement. With white clays a white cement can be made by the use of a diatomaceous earth free from staining oxids without the necessity of using unduly high temperatures.

The present invention is particularly valuable for making cement from iron ore. Most of the iron ores which are available, particularly on the Atlantic seaboard, are of high grade and contain relatively little silica and alumina in a combined form together with the iron oxid. The silica in iron ores, it may further be noted, is almost invariably in the form of quartz, though in some there is silica in combined form as more or less complex silicates coming from gangue minerals. But these complex silicates have the stated disadvantage that they introduce too high a per cent. of other bodies, such as magnesia, into finished cement to permit such cement to be marketed under existing standard cement specifications.

What I claim is:—

1. In the manufacture of ferric cements, the process which comprises predetermining a desired ratio between the combined silica and the combined ferric oxid in a ferric cement clinker to be made, adding to a cement mixture containing iron and calcareous material and deficient in combined silica an amount of diatomaceous earth sufficient with any combined silica which may be present to establish such ratio, and burning the mixture to form clinker.

2. In the manufacture of ferric cements, the process which comprises predetermining a desired ratio between the combined silica and the combined ferric oxid in a ferric cement clinker to be made, making a cement mixture of calcareous material and material comprising iron oxid in quantity sufficient to make a ferric cement, adding sufficient diatomaceous earth to bring the amount of silica to the desired ratio as regards ferric oxid, and burning the mixture to form clinker.

3. In the manufacture of ferric cement, the process which comprises mixing calcareous material, ferric oxid and diatomaceous earth in the proportions to make a cement clinker and burning the mixture to form clinker.

4. In the manufacture of ferric cement, the process which comprises mixing raw material containing combined silica in a proportion less than two times the amount of ferric oxid corresponding to the iron present with sufficient diatomaceous earth to bring the silica ratio above two times such amount, and then burning the mixture to form clinker.

5. In the manufacture of ferric cement, the process which comprises making an admixture of silica in the form of diatomaceous earth with iron oxid and calcareous material, the ratio between said silica and said iron oxid being at least above 2:1, and burning the mixture to make cement.

6. In the manufacture of ferric cement, the process which comprises making an admixture of silica in the form of diatomaceous earth with iron oxid and calcareous material, the ratio between said silica and said iron oxid being above 3:1, and burning the mixture to make cement.

7. In the manufacture of cements high in silica, the process which comprises adding to a cement mixture low in combined silica an amount of silica in the form of diatomaceous earth sufficient to bring the total of combined silica and such added silica to an amount more than two times the amount of sesquioxid present in such mixture, and burning the admixture to form clinker.

In testimony whereof, I affix my signature in the presence of witnesses.

EDWIN C. ECKEL.

Witnesses:
JOHN H. SIGGERS,
K. P. McELROY.